United States Patent [19]

Fortune

[11] 4,176,778
[45] Dec. 4, 1979

[54] SOLDERING TOOL HOLDER

[76] Inventor: William S. Fortune, 14250 Dearborn St., Panorama City, Calif. 91402

[21] Appl. No.: 881,615

[22] Filed: Feb. 27, 1978

[51] Int. Cl.$^2$ ............................................. B23K 3/00
[52] U.S. Cl. .................................. 228/57; 15/104.92; 15/236 A; 118/265; 248/117.4
[58] Field of Search ...................... 118/265; 15/104.92, 15/236 A; 248/117.2, 117.3, 117.4, 117.6; 228/57; 211/60 T; 219/242

[56] References Cited

U.S. PATENT DOCUMENTS

| | | | |
|---|---|---|---|
| 1,270,304 | 6/1918 | Kuhn | 219/242 |
| 1,616,721 | 2/1927 | Vallin | 248/117.3 |
| 2,174,230 | 9/1939 | Shangle | 219/242 X |
| 2,308,098 | 1/1943 | Neal | 228/57 |
| 2,847,972 | 8/1958 | Rosenthal | 118/265 |
| 3,609,791 | 10/1971 | Siegel et al. | 15/236 A X |
| 3,924,097 | 12/1975 | Knowles et al. | 248/117.2 X |
| 3,990,623 | 11/1976 | Fortune | 228/57 |

*Primary Examiner*—Francis S. Husar
*Assistant Examiner*—Kenneth J. Ramsey
*Attorney, Agent, or Firm*—Daniel T. Anderson

[57] ABSTRACT

A general purpose soldering tool holder which will fit most electrically-heated soldering instruments. The tool holder is provided with an external apertured grill to permit the circulation of air therethrough. The outer surface is maintained cool to the touch due to the provision of a heat shield spaced from the grill. The heat shield preferably consists of a material having low-heat transfer characteristics. The soldering instrument is guided by a tip alignment flap forming part of the heat shield. The instrument rests on an intermediate ledge forming part of the tool housing and on an upper rest shaped to accommodate the handle of the soldering instrument. The housing further includes trays for holding a solder spool and a desoldering braid spool which may also be mounted on a shaft. A well is provided in the housing upon which rests a non-wicking foam pad and an outer porous wicking pad for cleaning the tip of the instrument. This will reduce evaporation and subsequent cooling by the cleaning liquid. A cyclindrical opening is provided for housing a flexible sleeve which is threaded and meshes with a corresponding threaded locking bolt for securing the tool holder to a working bench.

15 Claims, 13 Drawing Figures

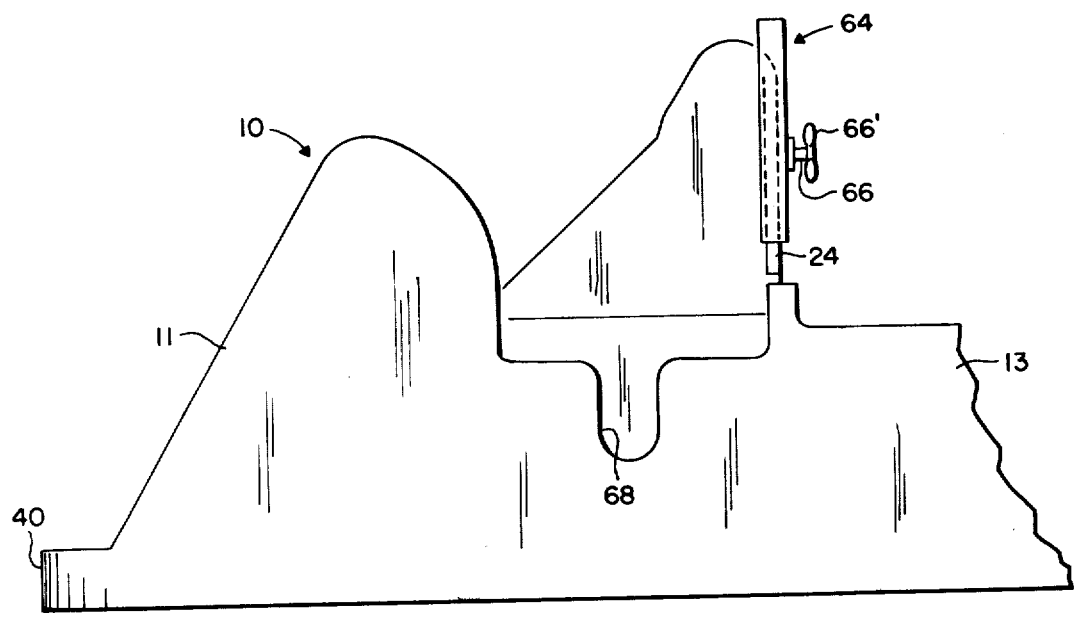
Fig. 6
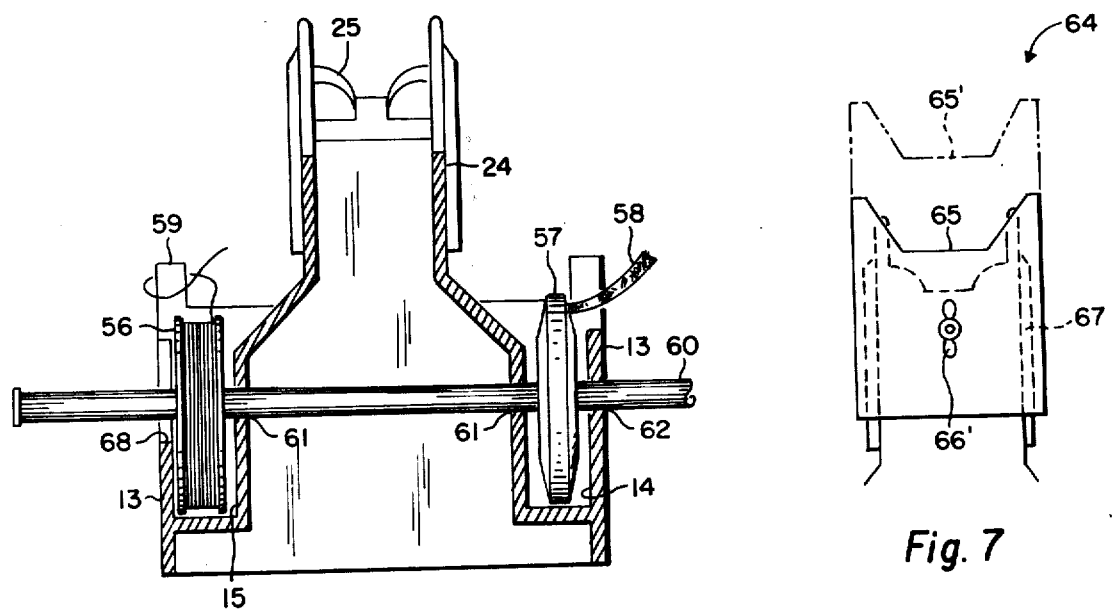
Fig. 5
Fig. 7

4,176,778

SOLDERING TOOL HOLDER

BACKGROUND OF THE INVENTION

This invention relates generally to holders for a soldering instrument and particularly relates to such a holder adaptable to most types of presently known electrically heated soldering instruments.

The present invention may be considered to be an improvement over the holder system for soldering instruments disclosed and claimed in the applicant's prior U.S. Pat. No. 3,990,623 which issued on Nov. 9, 1976.

The tool holder of the present invention may be considered a general purpose soldering tool holder. The exterior surfaces of the holder remain cool enough so that they can be easily handled by an operator. It accepts most of the major brand name soldering tools in the range between 15 and 50 watts. It includes a storage tray for spare solder tips or other small parts as well as a separate storage tray for a solder spool and a desoldering braid spool. Tip cleaning brushes are provided integral with the holder housing. A well or reservoir is provided for a tip cleaning liquid which substantially prevents spilling of the liquid.

Means are provided for preventing accidental pull-out of the soldering tool. The reason is that the tool must be lifted out of the holder so that the tool handle clears a handle latch which is an integral part of the tool holder.

Finally optional means may be provided for adjusting the rest for the soldering tool handle so as to accommodate different types of soldering instruments. Another optional equipment consists of a locking gate mechanism for locking the handle of the soldering tool.

SUMMARY OF THE INVENTION

Briefly, these and other features of the invention are achieved in accordance with the structural aspects of an example of the invention which is a holder for an electric soldering instrument. The soldering instrument conventionally includes a handle portion which may have a retaining shoulder of enlarged diameter about the periphery of its forward end. The soldering instrument further includes a working shaft extending axially forwardly therefrom. The working shaft terminates in a heatable tip element which may be electrically heated and the temperature of which may be electronically controlled. The latter may be effected in accordance with the temperature control soldering instrument disclosed and claimed in the applicant's prior U.S. Pat. No. 3,883,716.

The tool holder of the present invention comprises a housing body having a lower portion for housing the working shaft and tip element. The housing body also has an upper portion including intermediate catch means for catching the retaining shoulder of the instrument handle. The housing further includes an upper rest for the handle of the soldering instrument.

In order to maintain the outer surface of the tool holder at a temperature which will not burn the fingers of the operator, the housing body has an outer grill portion with perforated openings for the circulation of air therethrough. A heat shield preferably of a material of low-heat transfer characteristics is disposed spaced from and interiorly of the grill portion. The heat shield will thus provide a rest for the hot tip element of the instrument.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 5 is a lateral sectional view of the tool holder of the invention and illustrating a solder spool and a desoldering braid spool disposed in respective lateral pockets of the housing and a shaft or hand pin extending through the housing for suspending additional spools therefrom;

FIG. 6 is a side elevational view of a portion of the tool holder of the invention and including a slidable and lockable adapter for adapting the tool holder to different types of soldering instruments;

FIG. 7 is a rear elevational view of the adapter shown together with a portion of the tool holder in FIG. 6;

DESCRIPTION OF THE PREFERRED EMBODIMENT

Figure 1:
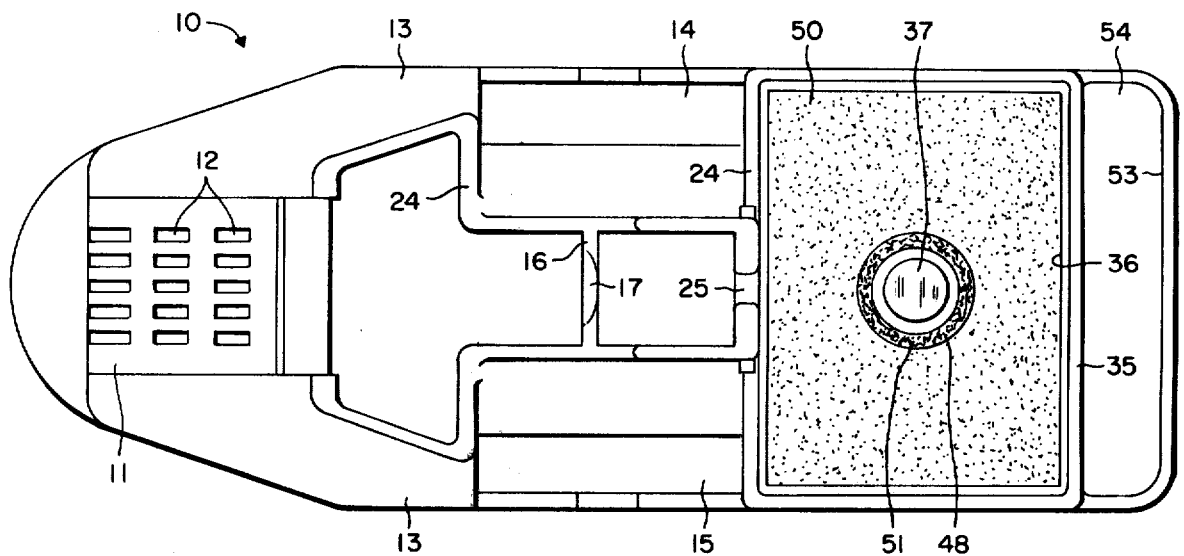
FIG. 1 is a top plan view of an example of the tool holder embodying the present invention.
Figure 2:
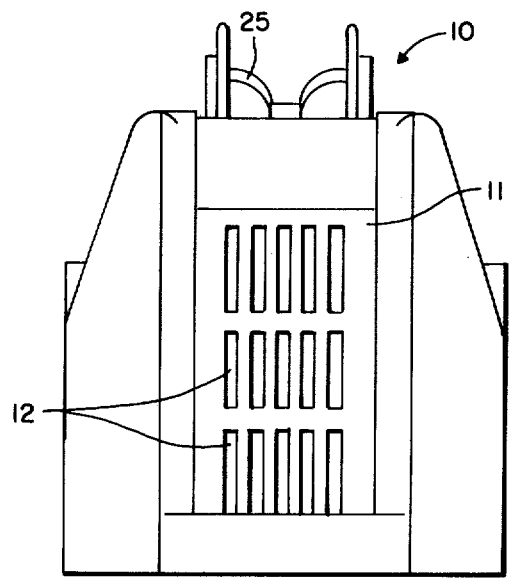
FIG. 2 is a front elevational view of the holder of FIG. 1.

Referring now to the drawings and particularly to FIGS. 1-5, there is illustrated by way of example a tool holder embodying the present invention for use with an electrically heated soldering instrument. As shown particularly in FIGS. 1 and 2, the tool holder includes a housing 10. The housing may, for example, be injection molded of a heat resistant and break resistant plastic material. This may, for example, consist of a phenolic material of the Bakalite type which retains its strength and durability even at elevated temperatures, that is at temperatures up to 400° F. The plastic may, for example, be a thermoset plastic.

The housing 10 includes a front grill 11 with a plurality of apertures 12 to permit the circulation of air therethrough by convection due to the heat generated by the tip of the soldering instrument. Adjacent to the side walls 13 of the housing 10 there may be provided a pair of storage trays 14 and 15 for storing for example, a solder spool and a desoldering braid spool as will be more fully explained in connection with FIG. 5.

Extending across the housing 10 there is a cross connection member 16 having a depression shown at 17 against which bears a disc 18 of enlarged diameter disposed at the periphery of the forward end of the handle 20 of a soldering instrument. As shown particularly in FIG. 3, the soldering instrument has a working shaft 21 extending axially from the handle 20 and terminating in a heatable solder tip 22.

The housing 10 has intermediate, generally upright walls 24 extending upwardly and provided across the rear wall with a generally V-shaped top portion 25 adapted to serve as a rest for the soldering instrument handle 20. Hence as clearly shown in FIG. 3, the soldering handle 20 rests upon the V-shaped end portion 25 of the rear vertical wall 24 while the enlarged diameter disc 18 rests below the handle catch 16. Finally the solder tip 22 rests against an internal heat shield 28 which is spaced from and interiorly of the grill 11 with its aperture 12. The heat shield 28 may consist of metal. Preferably it consists of a material having low heat-transfer characteristics, such as certain ceramic materials.

Figure 12:
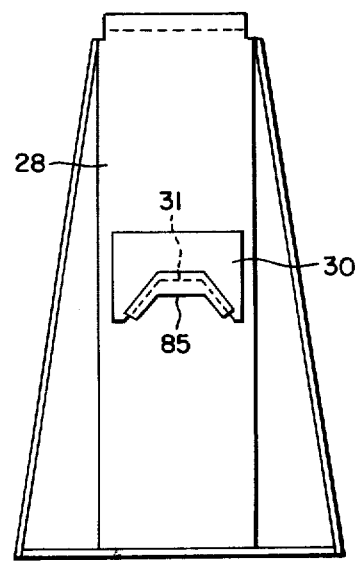
FIG. 12 is a rear elevational view of a heat shield and tip alignment flap, the edge of the latter being provided with a low-heat transfer material forming an edge gasket.

Instead of making the tip alignment flap 30 integral with the heat shield 28, it is also feasible to make the heat shield 28 of metal while only the tip alignment flap 30 consists of a low heat-transfer material, such as a suitable ceramic. Also a low heat-transfer glass fiber may be used. An alternate construction is shown in FIG. 12 to which reference is now made. Here the heat shield 28 and the tip alignment flap 30 may be made integral and may consist of metal. The generally V-shaped or U-shaped surface 31 of the flap 30 may be surrounded by a ceramic edge 85 which may consist of a foam ceramic or glass fiber. It operates as an edge gasket material to protect the flap 30 from the heat of the soldering instrument and to minimize the thermal energy drain from the instrument. Where the heat shield 28 consists of a metal and only the flap 30 consists of a material having low heat-transfer characteristics, the flap 30 may be secured to the heat shield 28 in any suitable manner, for example, by rivets or mounting screws.

Figure 3:
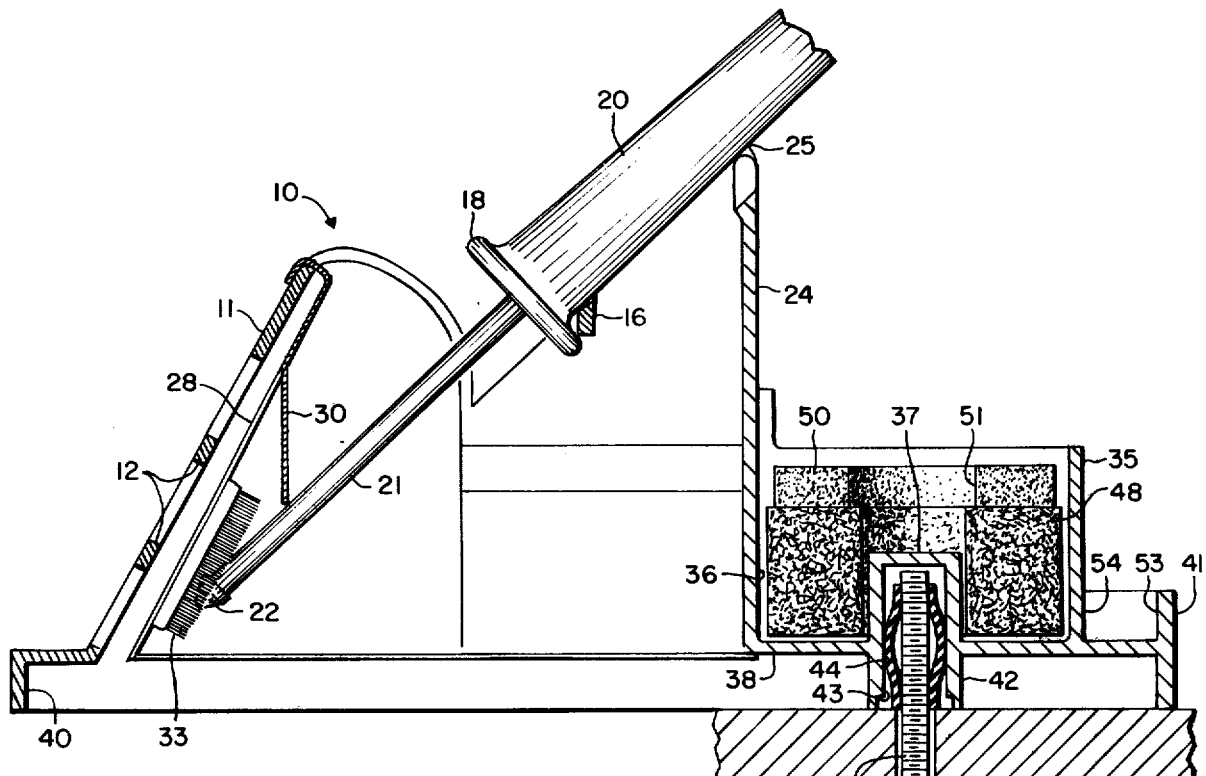
FIG. 3 is a longitudinal cross-sectional view of the tool holder of FIG. 1 showing a soldering instrument partly broken away and inserted into the tool holder.
Figure 4:
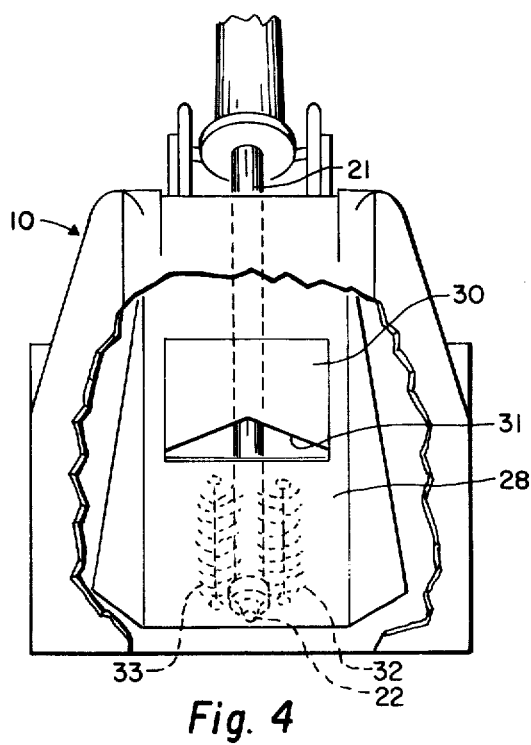
FIG. 4 is a front elevational view similar to that of FIG. 2 with the front grill broken away and illustrating the tool alignment flap, the tip cleaning brushes and a soldering instrument being inserted therein.

A pair of solder tip cleaning brushes 32 and 33 are disposed on either side of the path of the soldering tip 22 and are secured to the heat shield 28 as shown in FIG. 3 and 4. Hence every time the soldering instrument is inserted into the tool holder of the invention, the solder tip will be cleaned by the cleaning brushes 32 and 33.

Referring now particularly to FIGS. 1 and 3, the housing 10 has a rearwardly extending portion 35, forming a generally rectangular well 36. Projecting into the well 36 is a cylindrical, hollow boss 37. It extends through the bottom 38 of the housing 10 and through the base formed by a front portion 40, a rear portion 41 and an extension 42 of the boss 37.

Within the hollow, cylindrical space 43, formed by the boss 37, there is disposed an interiorly threaded deformable sleeve 44 which may, for example, consist of rubber. A threaded bolt 45 may be extended, for example, through a table-top 46 of a work bench and may be threaded into the sleeve 44. This in turn will deform the sleeve 44, pulling it downwardly until it is firmly wedged against the cylindrical space 43 thereby to hold the housing 10 against the table-top 46. This will secure the housing firmly to a work bench or the like.

The purpose of the well 36 is to receive a solder tip cleaning fluid such, for example, as distilled water or the like. Disposed in the well 36 in a non-wicking foam pad 48. It is preferably somewhat spaced from the clear space above the boss 37 to permit the operator to observe the liquid level. The pad 48 consists of an open pore material which does not absorb the liquid in the well 36. Hence it may be termed a non-wicking material. On top of the non-wicking pad 48 there is disposed a tip cleaning sponge 50 of substantially rectangular outline and having an inner, circular aperture 51 large enough so as not to obstruct the view of the liquid about the boss 37.

There are various reasons for the use of a porous, non-wicking foam pad 48. In the first place, the foam pad 48 provides a support above the liquid level in the reservoir 36 on which the tip cleaning sponge 50 may rest. In the second place, the open porous structure of the foam pad 48 allows liquid to circulate therethrough. On the other hand, the pad 48 serves as a baffle which helps to minimize spillage of the liquid in the well 36 in case the tool holder should be jarred or moved from place to place.

The tip cleaning sponge 50, of course, serves the purpose to clean the soldering tip of the soldering instrument. When the sponge 50 needs to be re-wetted, it is only necessary to push down on the top of the sponge 50. The foam pad 48 is soft and resilient and, hence, will allow the sponge to depress the pad downward to the liquid level to wet the sponge by capillary action. If a wicking-type foam pad were used, excessive evaporation of the cleaning liquid in the well 36 would result. This is due to the capillary exchange from the wet wicking foam pad to the tip cleaning sponge. Since the sponge rests on top of the foam pad 48 and is exposed to the air, the liquid would evaporate so that the liquid would rapidly disappear and incidentally maintain the tip cleaning sponge 50 at a temperature undesirably below room temperature.

Finally, at the rear of the well formed by the wall 35, there may be disposed another wall 53 integral with the rear base 41 to form another tray 54 which may be used to hold spare soldering tips or other equipment.

As shown particularly in FIGS. 5, the lateral or side pockets 14 and 15 of the housing 10 may be used to hold or house a solder spool 56 and a desoldering braid spool 57. The latter holds a braid 58 which absorbs hot solder. The solder from the solder spool 56 may be wrapped around a pull-peg 59 to facilitate breaking of the solder to the length required.

A shaft 60 may extend through the walls 13, that is through suitable holes 61, 62 provided through the walls 24 and the external walls 13. The shaft 60 may be used in the manner of a hang pin for hanging additional solder spools and desoldering braid spools on the hang pin 60.

Referring now to FIGS. 6 and 7, there is illustrated an adapter slide generally designated 64. The adapter slide has a top surface 65 of a roughly V-shaped or U-shaped outline to support the handle 20 of different types of soldering tools requiring different height of the upper tool rest. The adapter slide 64 extends about the intermediate walls 24 of the holder 10 and is provided with a nut 66 having a wing-type handle 66'. The adapter slide 65 may be moved in a slot, not shown, up or down as shown in FIG. 7 at 65 and 66' and may then be locked by threading the nut 66 against the wall 24 to lock the adapter slide in any desired position to adapt the holder 10 to different sizes and types of soldering instruments.

Thus the rear intermediate walls 24 may be formed to have guide rails 67 to guide the adapter 64 in its upward or downward motion. One of the outer walls 13 may have a U-shaped recess 68 so that the soldering spool 56 may be more readily grasped and removed when necessary.

It will be noted from an inspection particularly of FIG. 3 that the soldering instrument may not easily be accidentally pulled out of the holder 10. This is due to the fact that the circular extension 18 of the handle 20 is locked by the ledge 16. At the same time, the working shaft 21 is held downwardly by the tip alignment flap 30. Hence it will be obvious that in order to remove the soldering instrument 20, it will be necessary to first lift it so that the retaining shoulder or disc 18 is lifted free of the ledge 16 while at the same time the working shaft 21 is lowered, that is rotated in a counter-clockwise direction as viewed in FIG. 3 about the ledge 16 to free the working shaft 21 and tip 22 out of engagement with the flap 30 and its shaft engaging surface 31.

Figure 8:
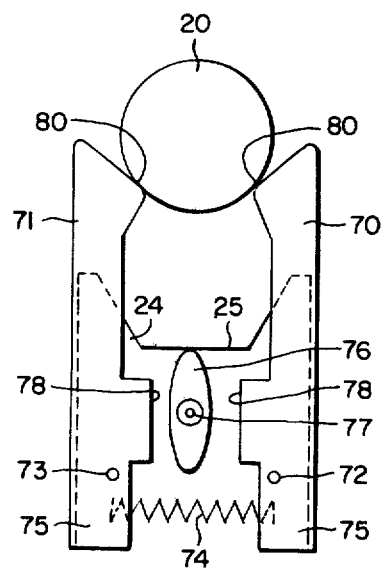
FIG. 8 is a rear elevational view of a locking gate mechanism including an extension spring for locking the handle of the soldering instrument and illustrated in its normal or closed position.
Figure 9:
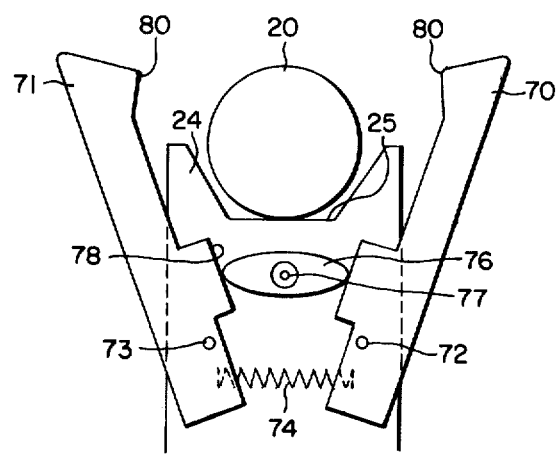
FIG. 9 is a view similar to that of FIG. 8 but illustrating the locking gate mechanism in an open position caused by the rotation of a cam.

Referring now to FIGS. 8 and 9, there is illustrated a locking gate mechanism which may be connected to the tool holder 10, that is to the rear intermediate wall 24 thereon. The locking gate mechanism of FIG. 8 includes two locking gates 70 and 71 pivoted respectively at 72 and 73. The two locking gates 70 and 72 are maintained in a normally closed position by a spring 74 connected to the lower ends 75 of the two locking gates 70 and 71; that is below their pivot points 72 and 73. Thus the spring 74 may be termed an extension spring. An eccentric cam 76 is pivoted at 77.

Hence when the cam is rotated from the vertical position of FIG. 8 in the horizontal position of FIG. 9, it will press against the cam engaging surfaces 78 of the two locking gates 70 and 71, thereby to open the locking mechanism as shown in FIG. 9. Hence a handle 20 of a soldering instrument will be able to pass through the nose portion 80 of the two locking gates 70 and 71 in the position of FIG. 9 Here the handle 20 rests on the surface 25 of the holder 10. Thereupon the cam 76 may be rotated into its horizontal position shown in FIG. 8 to securely lock the handle 20 by the noses 80 of the locking gates 70 and 71.

Figure 10:
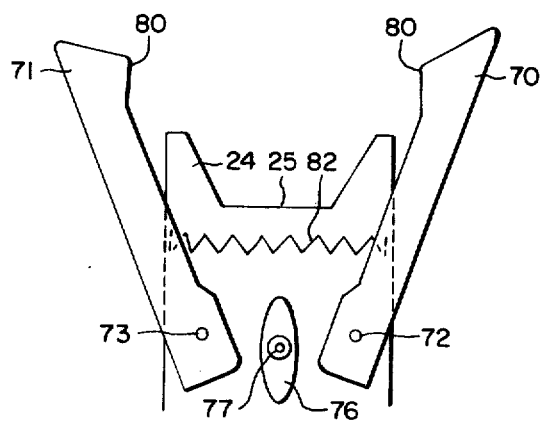
FIG. 10 is a rear elevational view of another type of tool locking gate mechanism including an extension spring and shown in its normally open position.
Figure 11:
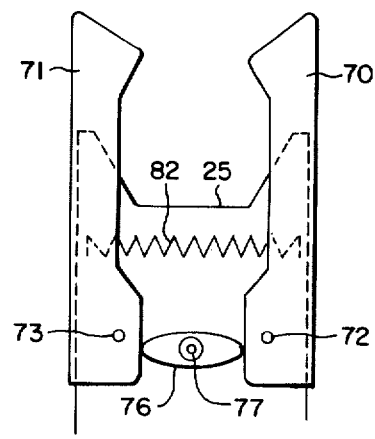
FIG. 11 is a view similar to that of FIG. 10 and illustrating the tool locking gate mechanism in its closed position caused by the rotation of a cam.

A similar tool locking gate mechanism is illustrated in FIGS. 10 and 11. This mechanism is arranged in such a manner that the locking gates are normally open and have to be forced into a closed position by a cam of eccentric shape.

While the locking gates of FIGS. 10 and 11 are identical to those of FIGS. 8 and 9, the locking gates are spring loaded by a spring 82 which normally holds the locking gate mechanism open. The mechanism can be forced into a closed position as shown in FIG. 11 by rotating the eccentric cam 76 into a horizontal position against the action of the spring 82. This will now hold a soldering tool handle and lock it so that it cannot be accidentally removed.

In some cases, the electrically heated soldering instrument may be of the temperature controlled type. An example of such an instrument is disclosed and claimed in the applicant's prior U.S. Pat. No. 3,883,716. In this case the electric power is on during a period of time sufficient to maintain the temperature of the soldering tip at some preset value. Hence it may be desirable to reduce heat radiation to a minimum while the temperature control soldering instrument is in the holder of the invention. This will, of course, reduce the on-time of the temperature controlled soldering instrument.

Figure 13:
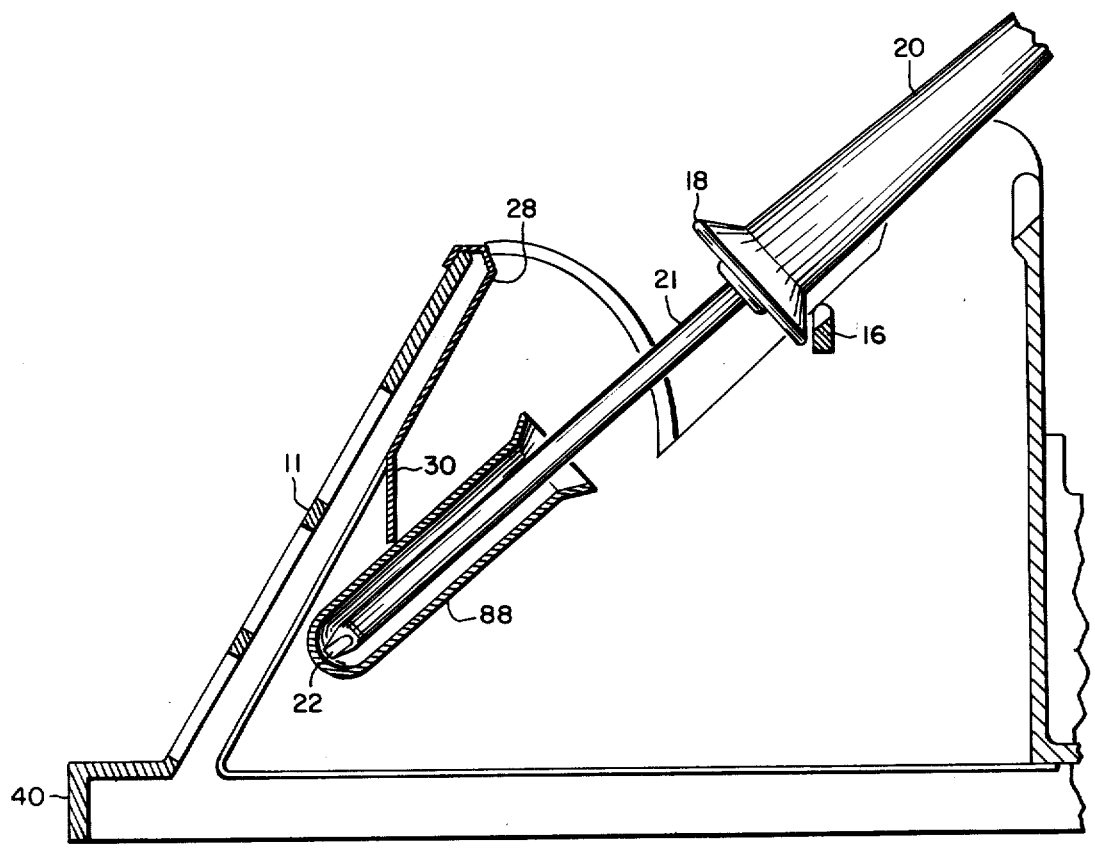
FIG. 13 is a longitudinal, cross-sectional view, parts being broken away of the tool holder of FIG. 1 provided with a heat blanket for minimizing thermal radiation from the hot solder tip of a soldering instrument.

To this end, a thermal heat blanket may be used of the type illustrated in FIG. 13. The blanket 88 surrounds the solder tip 22 and a portion of the working shaft 21. The thermal heat blanket may be of the type disclosed in the applicant's prior U.S. Pat. No. 3,990,623 in connection with FIGS. 15-21. Such a thermal heat blanket may consist of a suitable plastic material which is heat resistant. In this case the thermal heat blanket 88 is of the rigid type. Alternatively, the blanket may be made of a closely woven glass fiber material shaped like a pouch or pocket. The blanket 88 may be suspended in the holder 10 in any suitable manner. As indicated, such a heat blanket will appreciably reduce the power required by the soldering instrument while at rest.

There has thus been disclosed an improved soldering tool holder for holding electrically heated soldering instruments when they are at idle rest. The radiation from the hot solder tip may be minimized by a heat shield, which may consist of a low heat-transfer material. The heat shield is spaced from an outer grill which permits air circulation therethrough so as to keep the outside of the holder sufficiently cool so it can be easily handled by an operator. The holder further features a liquid well for a tip cleaning liquid which minimizes the danger of spilling the liquid and of evaporation thereof. Different types of soldering instruments may be accommodated by an adapter slide which can be moved up and down and locked in place. The holder is made in such a manner that it is difficult, if not impossible, to accidentally pull out the soldering instrument. Rather, it must be lifted out for removal. The soldering instrument may be additionally secured by an optional locking gate mechanism.

I claim:

1. A holder for an electric soldering instrument of the character including a handle portion having an enlarged diameter retaining shoulder about the periphery of its forward end, a working shaft extending axially forwardly therefrom and terminating in a heatable tip element, said holder comprising:

a housing body having a lower portion for housing the working shaft and tip element;

said housing body having an upper portion including intermediate catch means for latching the retaining shoulder of the instrument handle portion to prevent retraction of the instrument from the lower housing portion;

said housing body further including an upper rest means for supporting the handle of the soldering instrument while allowing said handle to be lifted to disengage the catch from the retaining shoulder;

said housing body having an outer grill portion with perforated openings for the circulation of air therethrough; and a heat shield disposed spaced from and interiorly of said grill portion to provide a rest for the tip element of the instrument and to maintain said housing body at a temperature which can be readily touched by the hand of an operator.

2. A holder as defined in claim 1 wherein said heat shield consists of a material of low heat-transfer characteristics.

3. A holder as defined in claim 1 wherein said heat shield includes a generally V-shaped tip alignment flap, thereby to center a soldering instrument inserted into said holder.

4. A holder as defined in claim 3 wherein said tip alignment flap consists of a material of low heat-transfer characteristics.

5. A holder as defined in claim 3 wherein said V-shaped surface of said tip alignment flap is protected by an edge gasket consisting of a material having low heat-transfer characteristics.

6. A holder as defined in claim 1 wherein said lower housing portion includes a pair of tip cleaning brushes disposed on either side of said lower housing portion for cleaning the tip element every time the instrument is inserted.

7. A holder as defined in claim 1 wherein said housing body is provided on its outside on either side with a pocket for holding respectively a solder spool and a desoldering braid spool.

8. A holder as defined in claim 7 wherein a shaft extends through said housing body and laterally thereof for holding additional solder spools and desoldering braid spools.

9. A holder as defined in claim 7 wherein the outside of said housing is provided with an additional storage tray for holding extra tip elements and the like.

10. A holder as defined in claim 1 wherein the rear area of said housing body is provided with a well for holding a tip cleaning liquid, a porous, non-wicking pad disposed in said well and a tip cleaning sponge disposed on top of said non-wicking pad.

11. A holder as defined in claim 10 wherein an externally open and interiorly closed, substantially cylindrical opening extends partially into said well, a threaded deformable sleeve disposed in said cylindrical opening and capable of cooperating with a threaded bolt extending through a fixed surface to tighten said sleeve and to hold said housing.

12. A holder as defined in claim 1 wherein thermal blanket means disposed internally thereof are provided for covering the electric soldering instrument to maintain its temperature.

13. A holder as defined in claim 1 wherein a locking gate mechanism is connected to said holder for locking a soldering instrument, said locking gate mechanism including two pivoted locking gates, spring means for normally maintaining said locking gates in a closed position and cam means operable against said locking gates for opening said locking gates against the action of said spring means.

14. A holder as defined in claim 1 wherein a locking gate mechanism is connected to said holder for locking a soldering instrument, said locking gate mechanism including two locking gates, each having a pivot point, and spring means for normally holding said locking gates open, and cam means operable against said locking gates for closing said locking gates against the action of said spring means.

15. A holder as defined in claim 1 wherein said upper rest means includes a slidable adapter disposed on the rear surface of said housing body, and means for sliding up or down and subsequently locking said adapter against said housing body.

* * * * *